United States Patent
Frazier et al.

(10) Patent No.: US 7,127,453 B1
(45) Date of Patent: Oct. 24, 2006

(54) GATHERING DATA FROM A DATABASE FOR DISPLAY

(75) Inventors: John D. Frazier, Romona, CA (US); Michael L. Reed, San Diego, CA (US)

(73) Assignee: NCR Corp., Dayton, OH (US)

( * ) Notice: Subject to any disclaimer, the term of this patent is extended or adjusted under 35 U.S.C. 154(b) by 122 days.

(21) Appl. No.: 09/703,157

(22) Filed: Oct. 31, 2000

(51) Int. Cl.
*G06F 17/30* (2006.01)

(52) U.S. Cl. .............................. 707/3; 707/10; 707/100

(58) Field of Classification Search ................ 707/100, 707/102, 513, 104.1, 103 R, 103 X, 103 Y, 707/103 Z, 3, 10, 1
See application file for complete search history.

(56) References Cited

U.S. PATENT DOCUMENTS

| | | | | |
|---|---|---|---|---|
| 5,966,135 A | * | 10/1999 | Roy et al. .................... | 345/619 |
| 5,970,499 A | * | 10/1999 | Smith et al. ............. | 707/104.1 |
| 5,987,454 A | * | 11/1999 | Hobbs .......................... | 707/4 |
| 6,038,566 A | * | 3/2000 | Tsai ........................... | 707/102 |
| 6,058,397 A | * | 5/2000 | Barrus et al. ............. | 707/104.1 |
| 6,061,689 A | * | 5/2000 | Chang et al. ........... | 707/103 R |
| 6,092,076 A | * | 7/2000 | McDonough et al. ....... | 707/102 |
| 6,230,174 B1 | * | 5/2001 | Berger et al. ............... | 715/513 |
| 6,253,210 B1 | * | 6/2001 | Smith et al. ............. | 707/104.1 |
| 6,262,741 B1 | * | 7/2001 | Davies ........................ | 345/423 |
| 6,337,693 B1 | * | 1/2002 | Roy et al. .................... | 345/619 |
| 6,343,290 B1 | * | 1/2002 | Cossins et al. ................ | 707/10 |
| 6,348,927 B1 | * | 2/2002 | Lipkin ......................... | 345/619 |
| 6,381,613 B1 | * | 4/2002 | Gallery et al. ........... | 707/104.1 |
| 6,720,981 B1 | * | 4/2004 | Berstis ........................ | 715/760 |
| 2002/0023110 A1 | * | 2/2002 | Fortin et al. ................. | 707/513 |
| 2002/0030702 A1 | * | 3/2002 | Gould et al. ................. | 345/850 |

OTHER PUBLICATIONS

Atalay et al. An SGML based viewer for form documents, Document Analysis Recognition, Proceed International Conference, date: Sep. 20-22, 1999, pp. 201-204.□□*
DeFazio, S Database extensions for complex forms of data, Data Engineering, 1999. Proceedings., 15th International Conference, date: Mar. 23-26, 1999, p. 166.*
Lovelace et al. Internet-based system for diagnosis of coronary artery disease, Computers in Cardiology 1998, date: Sep. 13-16, 1998, pp. 45-48.*
Taghva et al. Utilizing XML Schema for Describing and Querying Still image Database, Information Technology: New Genereations, 2006. ITNG 2006, date: Apr. 10-12, 2006, pp. 695-700.*

(Continued)

*Primary Examiner*—Jean M. Corrielus
*Assistant Examiner*—Baoquoc N. To
(74) *Attorney, Agent, or Firm*—Trop, Pruner & Hu; James Stover (57) ABSTRACT

A server system is capable of receiving requests from a client system for data within a database system, such as an object relational database system. In one arrangement, objects are stored in relational tables, with the objects containing geospatial data. The geospatial data contains one or more of the following: an image, points, lines, and polygons. The objects containing the geospatial data are combined by a layer manager executing in the server system to form a composite image. The composite image is represented in a file, such as a markup language file, that is communicated to the client system. In one embodiment, the file is a Virtual Reality Markup Language file.

8 Claims, 6 Drawing Sheets

OTHER PUBLICATIONS

Royappa et al. Implementing catalog clearinghouses with XML and XSL, Symposium on Applied Computing, Proceedings of the 1999 Synposium of Applied computing, date: 1999, pp. 616-621.*

Salminen et al. Requirements for XML document database systems, Proceedings of the 2001 ACM Symposium on Document engineering, date: 2001, pp. 85-94.□□*

B. Fraser et al. Dynamic views of SGML tagged documents, ACM Special Internet Group for Desgin of Communications, Proceedings of the 17th annual international conference on Computer document, date: 1999, pp. 93-98.*

Virtual Reality Modeling Language 2.0, "*An Overview of the Virtual Reality Modeling Language*", Version 2.0, Aug. 4, 1996, pp. 1-7.

Virtual Reality Modeling Language 2.0 "*The Virtual Reality Modeling Language Specification*", Version 2.0, ISO/IEC CD 14772, Aug. 4, 1996, Chapters 1-7.

* cited by examiner

GATHERING DATA FROM A DATABASE FOR DISPLAY

TECHNICAL FIELD

The invention relates to gathering data from a database for display.

BACKGROUND

Database systems are used to collect and store various types of information that are later extracted for viewing or manipulation. Various different types of database systems exist, including relational database systems, object relational database systems, and others.

A user usually gains access to a database system through a client system that is coupled to the database system over a network. In response to commands entered or selected by a user, the client system issues requests to the database system for desired data. Upon receiving data from the database system, the client system presents the received data to the user in some predetermined format.

Relational database systems store data in relational tables. When a query, such as a Structured Query Language (SQL) query is received, a subset of the data is extracted from the relational tables. Typical data types defined in relational databases include relatively simple data types, such as integers, real numbers, and character strings. Database systems have also been developed to store and manipulate more sophisticated data types, such as audio data, video data, multimedia data, image data, formatted documents, maps, and so forth. One example of a database system that is capable of supporting such data types is an object relational database system.

One data type in object relational databases is the geospatial data type, which includes data used for geographic or spatial representations, such as for maps or other images in which some spatial relationship can be defined between various objects in the image. However, convenient display mechanisms have not been provided to visually depict these types of data.

SUMMARY

In general, a method of gathering data from a database comprises receiving, in a server system, objects containing image data extracted from the database in response to a request received from a client system, with the objects corresponding to one or more layers. In the server system, the objects are combined and a file containing a representation of the image data is created for communication to the client system.

Other features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
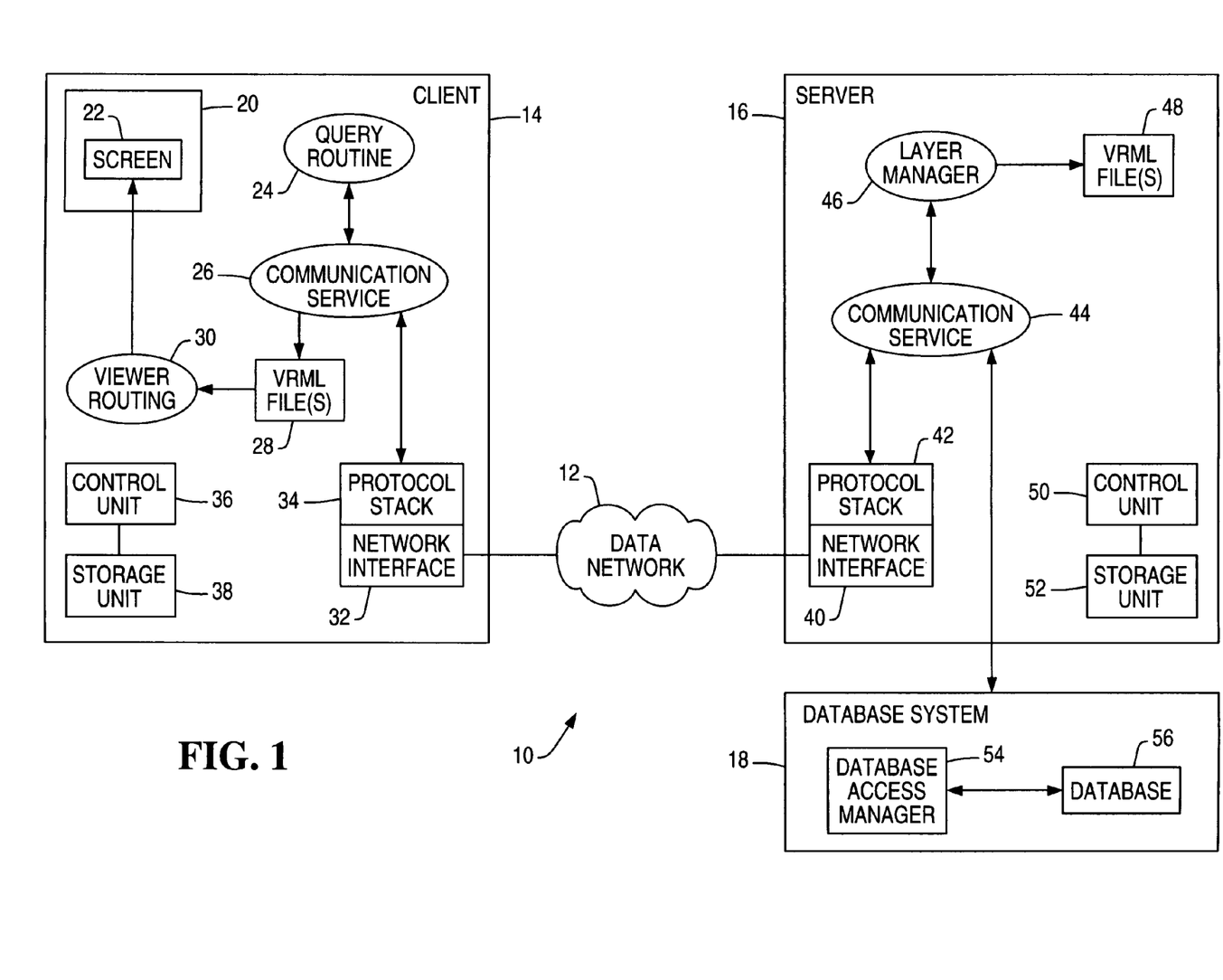
FIG. 1 is a block diagram of an embodiment of a communications system having a client system, a server system, and a database system.

FIG. 1 illustrates a communications system 10 having a data network 12 that is coupled to a client system 14 and a server system 16. Although only one client system 14 is illustrated, other embodiments include multiple client systems 14 that have access to the server system 16 over the data network. Examples of the data network 12 include local area networks (LANs), wide area networks (WANs), and a public network such as the Internet. The server system 16 is able to access the database system 18 in response to requests from the client system 14.

The database 18 includes a database 56 and a database access manager 54. In one example embodiment, the database system 18 is an object relational database system. Other examples of the database system 18 include relational database systems or other types of database systems.

One type of data that can be stored in the database 56 is geospatial data, which is data that enable geographic or spatial representations. For example, geospatial data can be used to represent maps, where locations on the maps can be defined in geographic or spatial terms. Other elements (such as images or a collection of images) can also be represented by geospatial data.

In one embodiment, geospatial data includes points, lines, polygons, and images. For example, an image can be a background image over which points, lines, and polygons are drawn to depict a composite or resultant image. The points, lines, polygons, and images are stored in the database 56 in relational tables. In response to queries from the client system 14, points, lines, polygons, and images are extracted from the relational tables. The points, lines, polygons, and images are then combined in the server system 16 by a layer manager 46 to form the resultant image, which is represented in a format that is understood by the client system 14. For example, a markup language can be used to represent the resultant image. Other formats for representing the resultant image can also be employed, provided that the format is understood by network elements coupled to the data network 12. For example, instead of a markup language, the format can be a computer-aided design (CAD) format or other format.

The server system 16 includes a communications service 44 that is able to send requests to the database system 18. Although not shown, the communications service 44 can communicate through some type of a link interface, such as a LAN interface, to the database system 18. As discussed above, the server system 16 also includes a layer manager 46, which combines or aggregates objects extracted from the database 56 into files 48 that contain information that visually represent an image that can be depicted in the client system 14.

In one embodiment, the information is in a markup language such as the Virtual Reality Modeling Language (VRML), which is a file format for describing interactive three-dimensional objects and virtual worlds that can be experienced by a user. VRML is described in the "Virtual Reality Modeling Language Specification," Version 2.0, ISO/IEC CB 14772, dated in August 1996. Other markup languages include the Hypertext Markup Language (HTML) and the Extensible Markup Language (XML). HTML is described in "HTML 4.0 Specification," W3C Recommendation, dated April 1998; and XML is described in "Extensible Markup Language (XML™) 1.0," W3C Recommendation, dated February 1998. VRML, HTML, and XML provide common platform-independent languages that can be exchanged between systems over the data network 12.

In the ensuing description, reference is made to files 48 according to VRML; however, in further embodiments, other formats can be used to represent images to be transported to the client system 14 for display. The VRML files 48 created by the layer manager 46 are communicated by the communications service 44 to the client system 14 over the data network 12.

The server system 16 includes a network interface 40 coupled to the data network 12, and a protocol stack 42 above the network interface 40. One example of the protocol stack 42 is a UDP/IP (User Datagram Protocol/internet Protocol) stack. IP specifies packet-based communications over the data network 12, and is described in Request for Comments 791, entitled "Internet Protocol," dated September 1981. UDP is a transport layer for managing connections between nodes over a data network, and is described in RFC 768, entitled "User Datagram Protocol," dated August 1980.

The client system 14 also includes a network interface 32 that is coupled to the data network 12. Above the network interface 32 is a protocol stack 34, which is similar to the protocol stack 42 of the server system 16. The client system 14 also includes a communications service 26 for enabling communications over the data network 12 with the server system 16.

The VRML files 48 transmitted by the server system 16 are received by the client system 14 as VRML files 28. The VRML files 28 are accessible by a viewer routine 30, such as a VRML browser, which is able to present information in the VRML files 28 in a screen 22 of a display 20 in the client system 14.

The client system 14 also includes a query routine 24 that, in response to user actions, sends requests to the server system 16 for data in the database 56. For example, the query routine 24 is in communications with a graphical user interface (GUI) routine (not shown) that is adapted to receive selections made in a GUI screen (which can be the screen 22) in the display 20. In response to user actions, the query routine 24 prepares a query string, such as a Structured Query Language (SQL) string, which is defined by ANSI (American National Standards Institute). The query string created by the query routine 24 is placed into a format that can be communicated over the data network 12. One example of such a format is the Hypertext Transfer Protocol (HTTP) format, as described in RFC 2068, entitled "Hypertext Transfer Protocol—HTTP/1.1," dated January 1997. To enable communications of HTTP requests, the communications services 26 and 44 in the client system 14 and server system 16, respectively, include HTTP service modules.

Figure 2:
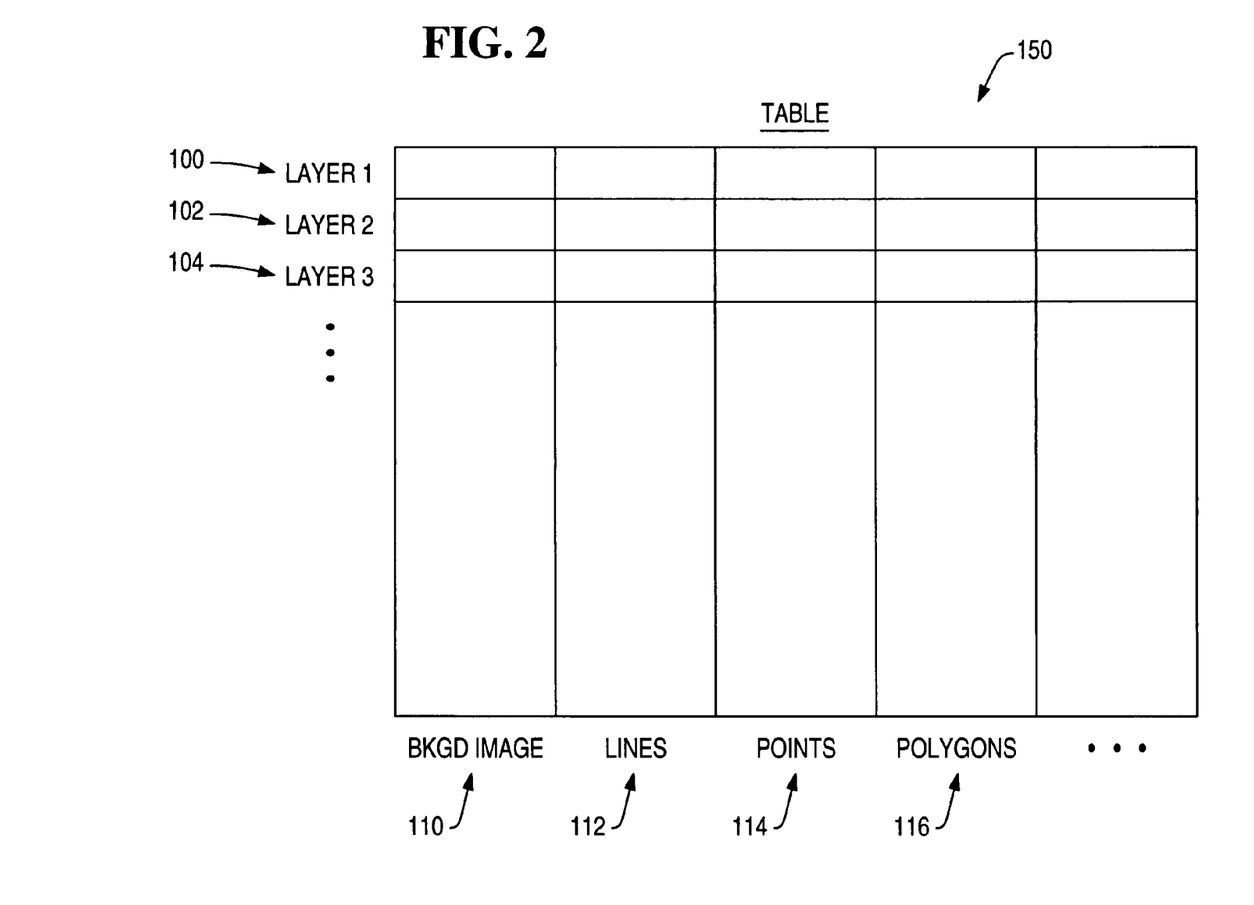
FIG. 2 illustrates a table having rows and columns containing objects according to the geospatial data type.

FIG. 2 shows a table 150 that is stored in the database 56. In one example, the table 150 is an object relational table that has rows and columns defining entries that contain objects. In one embodiment, the data type of the objects stored in the table 150 is the geospatial data type. However, in other embodiments, other types of complex data types can also be employed.

In one example, the objects stored in the table 150 are used to form "resultant" images (or images that result from a combination of other elements). For example, the resultant images are formed from a combination of a background image and various points, lines, and polygons that can be drawn over the background image. In table 150, the background image corresponding to each layer is stored in a column 110, the lines corresponding to each layer are stored in a column 112, points corresponding to each layer are stored in the column 114, and polygons corresponding to each layer are stored in column 116. Each row can correspond to a different layer, with row 100 storing objects corresponding to layer 1, row 102 storing objects corresponding to layer 2, and row 104 storing objects corresponding to layer 3. Each layer can also be stored in multiple rows, if additional entries are needed to store objects in that layer.

In response to a query, such as an SQL query, objects are extracted from the appropriate rows and columns of the table 150. The objects extracted include an object containing a background image and objects containing points, lines, and polygons to draw over the background image. Depending on what is requested, only one layer may be extracted or multiple layers may be extracted to form the resultant image. The represented resultant images may be two-dimensional or three-dimensional images. The images may be still images, or they may be video images. For video images, successive layers in the table 150 can correspond to successive frames that are displayed to impart motion to what is being displayed.

The objects extracted from the database 56 are received by the layer manager 46, which combines or aggregates the objects into a composite image (the resultant image). In one embodiment, the resultant image is placed into the VRML format for interactive, three-dimensional visual representation. In other embodiments, instead of the VRML format, other formats can be used.

Figure 3:
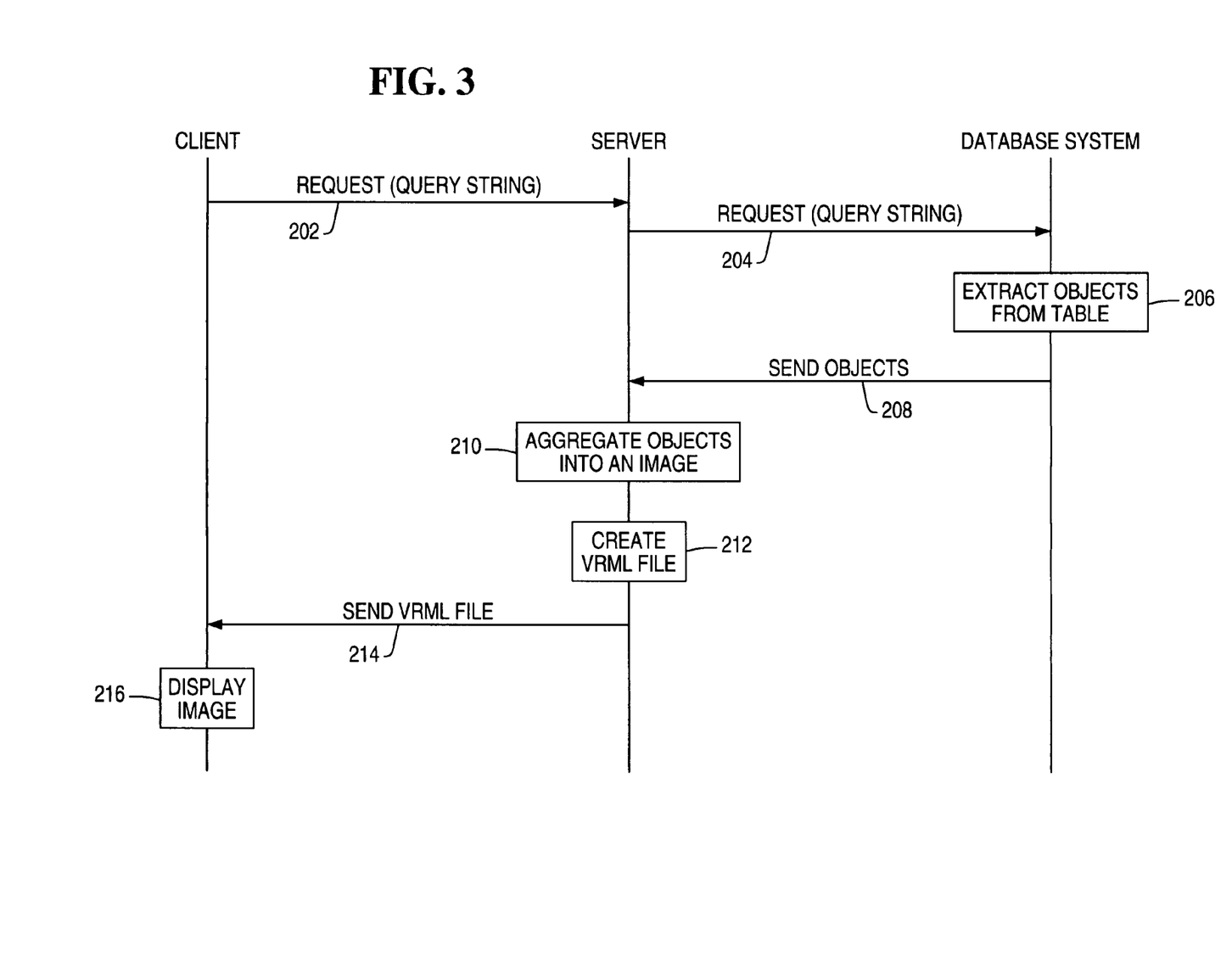
FIGS. 3 and 4 are message flow diagrams of messages exchanged between, and actions performed by, the client system, server system, and database system of FIG. 1.

FIG. 3 shows a message flow diagram of messages exchanged between, and actions performed by, the client system 14, server system 16, and database system 18. In response to a user action (such as selection of an icon or other element in the display 20 or activation of a button), the client system 14 sends (at 202) a request that contains a query string, such as an SQL string. When the server system 16 receives the request, the server system 16 sends another request (at 204) containing the query string to the database system. In one example embodiment, the request sent at 202 is an HTTP request, while the request sent at 204 is an Open Database Connectivity (ODBC) request. The ODBC interface is a call-level interface to enable an application to communicate with a database manager. In other embodiments, other request formats can be employed.

In response to the request communicated at 204, the database system 18 extracts (at 206) objects from the table 150. The extracted objects are then sent (at 208) to the server system 16. The server system 16 combines or aggregates (at 210) the objects into a resultant image. The layer manager 46 in the server system 16 then creates (at 212) a VRML file 48 to represent the resultant image, with the VRML file 48 sent (at 214) to the client system 14. In the client system 14, the viewer routine 30 displays (at 216) the image represented by the received VRML file 28.

Figure 4:
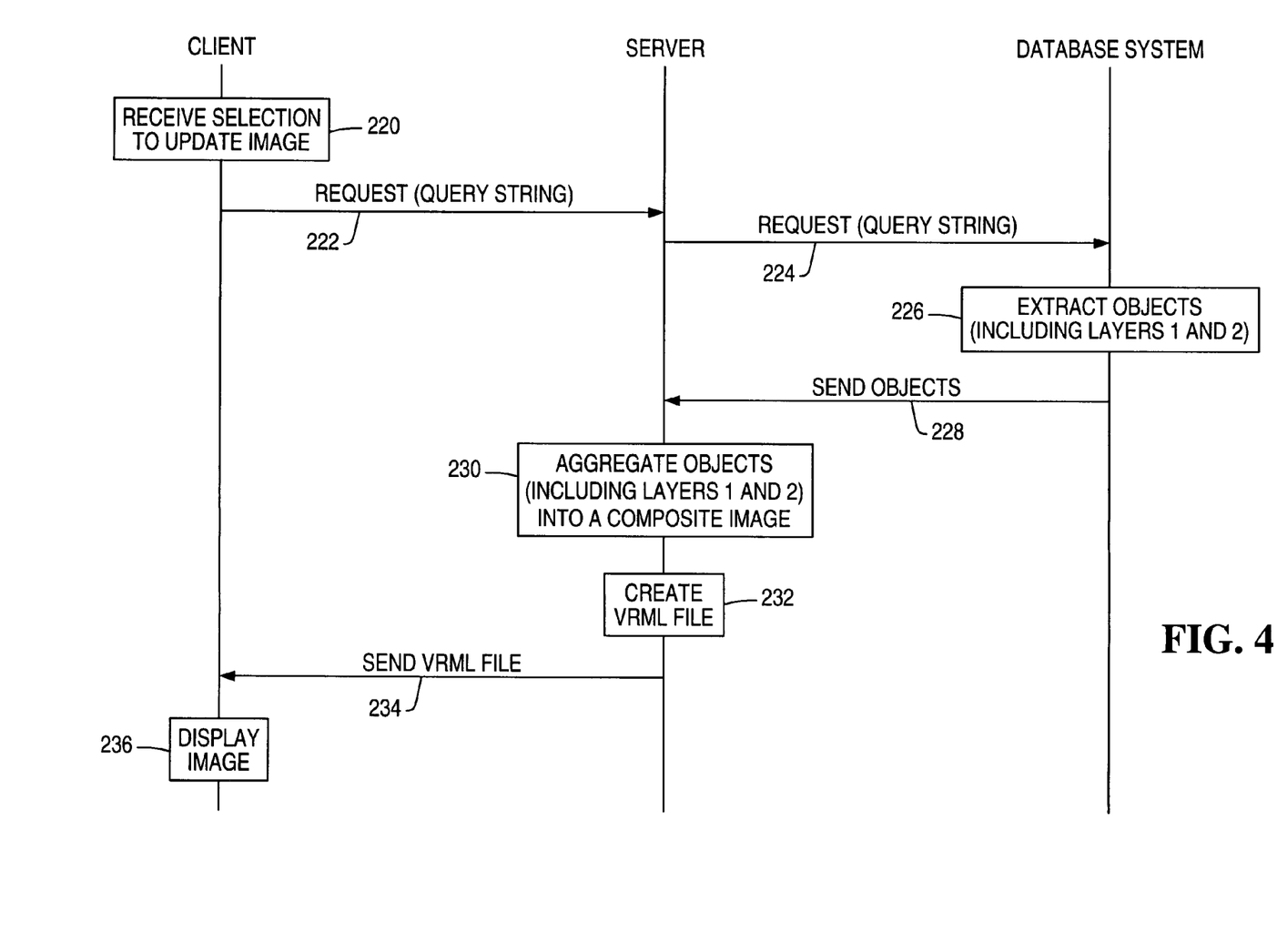

One aspect of an image represented according to VRML is its interactive nature. The VRML file can define "sensor nodes" that set off events when a user moves to certain areas of the image and/or when the user clicks on certain elements in the image. Thus, if a user performs an action in the image, such as by moving a pointer device (e.g., a mouse) or clicking on an element in the image, that action is communicated to the query routine 24. As shown in FIG. 4, upon receiving (at 220) the user selection to update the displayed image, the query routine 24 prepares a query string that seeks information responsive to the user action. In one case, the user action can specify additional layers to add to the image. The query string can be a string that requests multiple layers (including the original layer and additional one or more layers).

The client system 14 sends a request (at 222) containing the query string to the server system 16, which then sends (at 224) a request containing the query string to the database system 18. In response to the query, the database system 18 extracts objects (at 226) associated with the multiple layers from the table 150. The extracted objects are sent (at 228) to the server system 16. In the server system 16, the layer manager 46 combines or aggregates (at 230) the objects (corresponding to the multiple layers) into a composite image. The composite image is represented by creating another VRML file (at 232). The server system 16 then sends the VRML file (at 234) to the client system 14, which then displays (at 236) the image specified in the VRML file.

Figure 5:
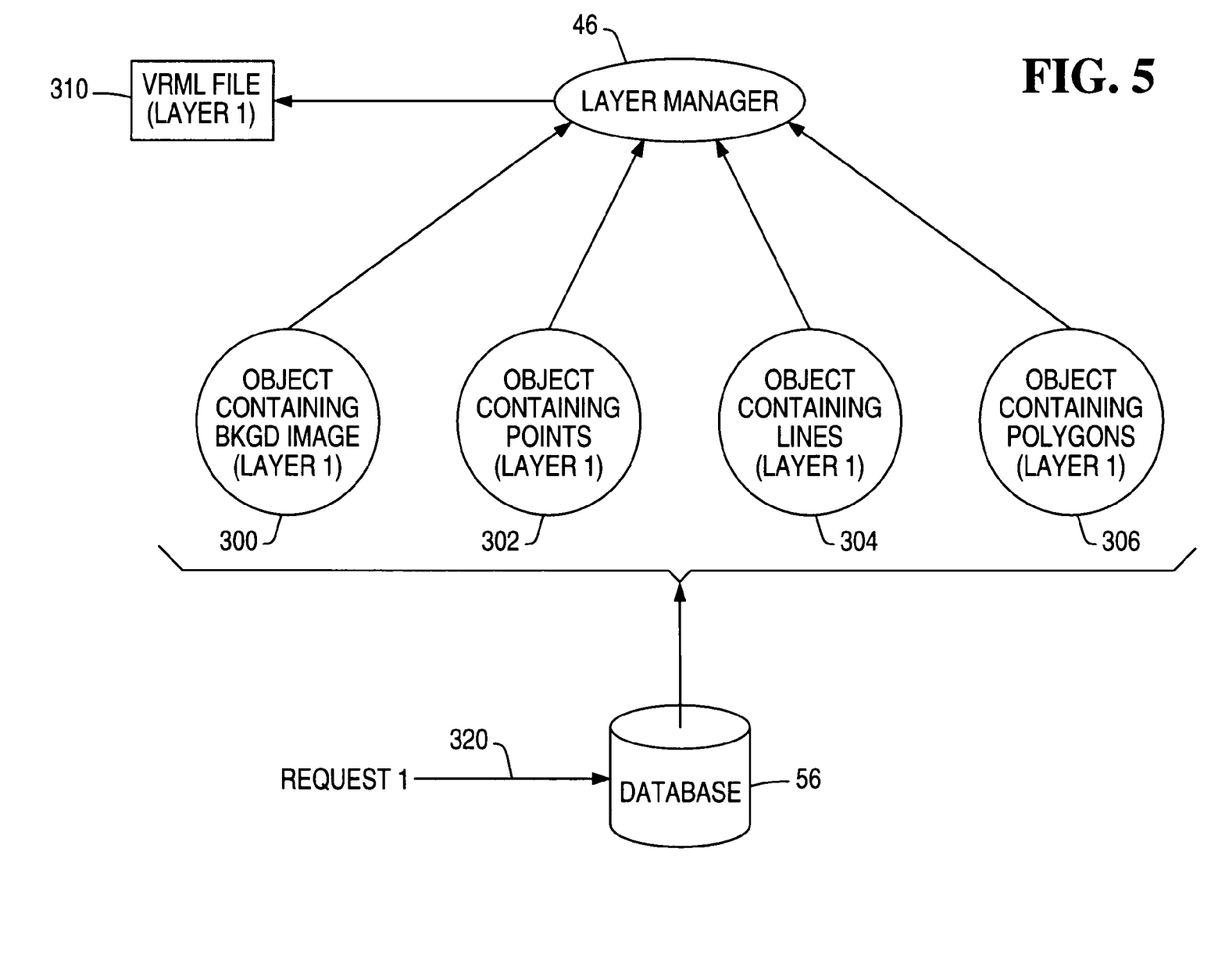
FIGS. 5 and 6 illustrate extraction of objects in response to requests and combining the objects into a file.

FIG. 5 shows extraction of layer 1 objects 300 (background image), 302 (points), 304 (lines), and 306 (polygons) in response to a first request 320. The objects 300, 302, 304, and 306 are communicated to the layer manager 46, which combines the objects into a composite image and represents the composite image in a VRML file 310.

Figure 6:
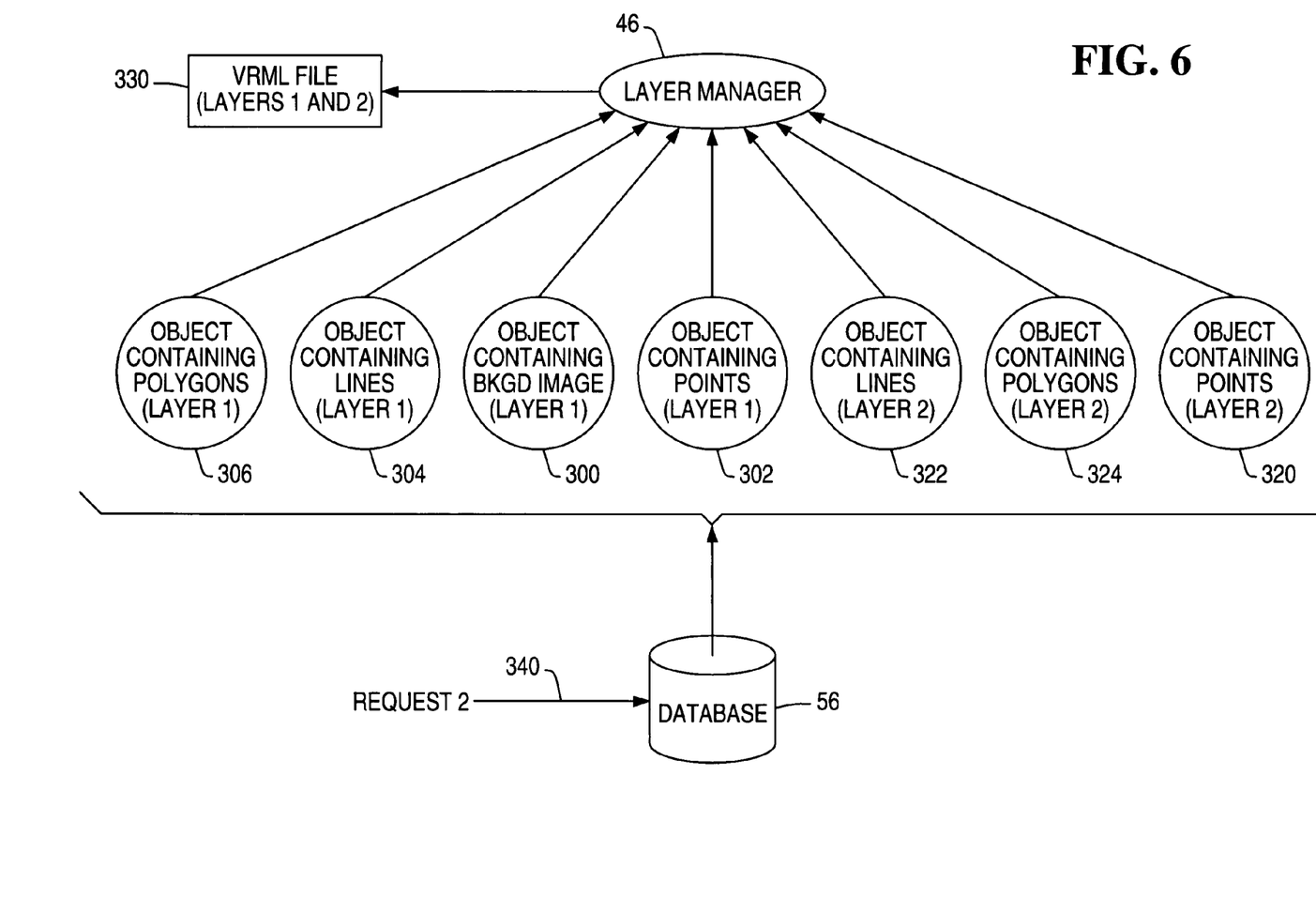

FIG. 6 shows extraction of objects from the database 56 for both layers 1 and 2 in response to a second request 340. The second request 340 may have been generated by the client system 14 in response to user action in the layer 1 image, as discussed above. The layer 1 objects 300, 302, 304, and 306 are extracted along with layer 2 objects 320 (containing points), 322 (containing lines), and 324 (containing polygons). The objects 300, 302, 304, 306, 320, 322, and 324 are combined by the layer manager 46 and represented in a VRML file 310.

In another embodiment, instead of having to re-extract both layer 1 and layer 2 objects, the layer 1 image can be stored in the server system so that only layer 2 objects need be extracted from the database 56. By reducing the number of objects that have to be extracted, processing time is reduced in response to requests from the client system 14.

As discussed above, various software routines or modules are executable on corresponding control units in the client system 14 and server system 16. Each of the control units includes a microprocessor, a microcontroller, a processor card (including one or more microprocessors or microcontrollers), or other control or computing devices. As used here, a "controller" refers to hardware, software, or a combination of both.

The storage units referred to in this discussion include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines or modules are stored in respective storage units. The instructions when executed by a respective control unit cause the corresponding system to perform programmed acts.

The instructions of the software routines or modules are loaded or transported to each system in one of many different ways. For example, code segments including instructions stored on floppy disks, CD or DVD media, a hard disk, or transported through a network interface card, modem, or other interface device are loaded into the system and executed as corresponding software routines or modules. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of gathering data from a database, comprising:

storing within a database table, objects containing geospatial image data, said database table comprising at least one row including objects having multiple data types, each data type being stored within a different column within said database table, said multiple data types include at least one of the following elements: an image, points, lines, and polygons;

receiving, in a server system, objects containing geospatial data extracted from at least one row of said database table in response to a first request received from a client system, the objects corresponding to one or more layers;

in the server system and in response to said first request, combining the objects and creating a first markup language file containing a representation of the image data for communication to the client system;

displaying said representation of the image data in the client system;

generating a second request for at least one additional layer of image data in response to a selection at said client system of an element of the displayed representation of the image data in the client system;

receiving, in said server system, additional objects containing geospatial data extracted from at least one additional row of said database table in response to said second request received from said client system, the objects corresponding to said at least one additional layer of image data;

in the server system and in response to said second request, combining the additional objects and creating a second markup language file containing an updated representation of the image data for communication to the client system; and displaying said updated representation of the image data in the client system.

2. The method of claim 1, wherein said database comprises an object relational database.

3. The method of claim 1, wherein creating said first and second markup language files comprises creating first and second Virtual Reality Markup Language files, respectively.

4. The method of claim 1, wherein combining the objects comprises combining two or more of the image, points, lines, and polygons.

5. The method of claim 4, wherein creating said first and second markup language files comprises creating first and second Virtual Reality Markup Language files, respectively.

6. A system comprising:

a database including a database table, said database table comprising at least one row including objects containing geospatial data, said objects having multiple data types, each data type being stored within a different column within said database table, said multiple data types including at least one of an image, points, lines, and polygons;

an interface to said database system;

an interface to a client system;

a controller adapted to receive a first request from the client system, and in response to said first request: receive objects containing geospatial data extracted from the database system and combine the objects into a first markup language file that provides a visual representation of the image data;

means for displaying said visual representation of the image data in the client system; and said controller further adapted to receive a second request from the client system generated in response to a selection at said client system of an element of the displayed representation of the image data in the client system, and in response to said second request: receive additional objects containing geospatial data extracted from the database system and combine the additional objects into a second markup language file that provides an updated visual representation of the image data.

7. The system of claim 6, wherein the database system comprises an object relational database system.

8. The system of claim 6, wherein the first and second markup language files comprise first and second Virtual Reality Markup Language files, respectively.

* * * * *

UNITED STATES PATENT AND TRADEMARK OFFICE
CERTIFICATE OF CORRECTION

PATENT NO. : 7,127,453 B2 Page 1 of 1
APPLICATION NO. : 09/703157
DATED : October 24, 2006
INVENTOR(S) : D. Frazier and M. Reed It is certified that error appears in the above-identified patent and that said Letters Patent is hereby corrected as shown below:

Column 6, Line 19, after "tial" delete "image"

Signed and Sealed this

Twentieth Day of November, 2007

JON W. DUDAS
*Director of the United States Patent and Trademark Office*